United States Patent [19]
Tsutsui

[11] Patent Number: 5,699,333
[45] Date of Patent: Dec. 16, 1997

[54] OPTICAL DISK REPRODUCING METHOD AND APPARATUS HAVING FOCUSING GAIN AND OFFSET CORRECTION CAPABILITY

[75] Inventor: Keiichi Tsutsui, Kanagawa, Japan

[73] Assignee: Sony Corporation, Tokyo, Japan

[21] Appl. No.: 576,320

[22] Filed: Dec. 21, 1995

[30] Foreign Application Priority Data

Dec. 22, 1994 [JP] Japan .................................. 6-320104

[51] Int. Cl.$^6$ .............................. G11B 7/00; G11B 5/09
[52] U.S. Cl. ..................... 369/44.29; 369/44.35; 369/50; 369/60
[58] Field of Search ........................ 369/47, 48, 54, 369/58, 60, 44.32, 32, 44.27, 44.28, 44.29, 44.31, 44.35, 44.36, 50

[56] References Cited

U.S. PATENT DOCUMENTS

| 5,289,440 | 2/1994 | Bakx | 369/32 |
|---|---|---|---|
| 5,463,607 | 10/1995 | Roth et al. | 369/60 |

FOREIGN PATENT DOCUMENTS

| 0 550 097 | 7/1993 | European Pat. Off. |
|---|---|---|
| 0 620 548 | 10/1994 | European Pat. Off. |

*Primary Examiner*—Paul W. Huber
*Attorney, Agent, or Firm*—William S. Frommer; Alvin Sinderbrand

[57] ABSTRACT

A method and apparatus for optically reading out prerecorded signals on an optical disc by way of data reproduction. If the quantity of playback data read out from an optical disc 1 and stored in a memory 8 during data reproduction is found to be in excess of a quantity for one rotation of the optical disc, data writing in the memory 6 is discontinued and an optical pickup 3 is caused to make track jump to a reproduced track under control by a controller 7. A servo gain control signal or a servo offset control signal is sent to a servo circuit 8 which then performs focusing servo control or tracking servo control of the optical pickup 3. The writing stop position on the optical disc 1 is then detected and data playback is re-initiated. Stabilized data playback is enabled even if servo error signals are fluctuated within the optical disc or the servo error signals are changed due to temperature changes in the optical pickup or in the error signal detecting amplifier.

20 Claims, 6 Drawing Sheets

OPTICAL DISK REPRODUCING METHOD AND APPARATUS HAVING FOCUSING GAIN AND OFFSET CORRECTION CAPABILITY

BACKGROUND OF THE INVENTION

This invention relates to a method and apparatus for optically reading out previously recorded signals on an optical disc by way of data reproduction. In an optical disc reproducing device for reading out and reproducing recorded signals on the optical disc used as a disc-shaped recording medium, an optical pickup device is employed for optically reading out the recorded signal. This optical pickup includes laser outputting means, made up e.g., of a laser diode, and is configured for condensing and illuminating the laser light outgoing from the laser outputting means on the optical disc and for receiving the light reflected from the optical disc for outputting the received reflected light as electrical signals by way of reading out the pre-recorded signals as RF signals.

At the same time as the pre-recorded signals are read out, servo error signals in the vertical direction and in the tracking direction of the optical pickup with respect to the optical disc are outputted as focusing error signals and as tracking error signals, respectively. As the recorded signals are read out, focusing servo and tracking servo are carried out using the focusing error signals and the tracing servo signals. For the case in which the optical disc presents significant warp, it is contemplated to perform skew servo for controlling the tilt of the optical axis of the optical pickup with respect to the optical disc.

For stable readout of the pre-recorded signals, it is necessary to maintain the respective servo gain values in a pre-set range. On the other hand, it is also necessary to set the converging positions of the laser light beams at an optimum position for signal readout during the respective servo operations.

On the other hand, since the servo error signals employed in these servo operations, such as focusing error signals or tracking servo signals, are produced by monitoring the light reflected by the optical disc, it may occur that these servo error signals be fluctuated under the effect of optical disc fluctuations or temperature changes in the optical pickup. These fluctuations tend to change the gain or offset of the servo error signals, this producing variations in the servo gain values or converging positions.

However, the effect of the fluctuations in the servo gain or offset has so fat not been taken into consideration.

Heretofore, if servo error signals are fluctuated within the optical disc during data reproduction from the optical disc, or if variations are produced in the servo error signals due to temperature changes in the optical disc reproducing apparatus, the servo gain or offset is changed thus rendering stabilized data reproduction impossible.

OBJECT AND SUMMARY OF THE INVENTION

It is therefore an object of the present invention to provide a method and apparatus for reproducing an optical disc in which, if the servo gain or offset is fluctuated during data reproduction of reading out recorded signals from the optical disc by way of data reproduction, it becomes possible to achieve optimum gain or offset control.

In one aspect, the present invention provides a device for reproducing an optical disc having an optical pickup, reproducing means for producing data from RF signals reproduced by the optical pickup at a rate exceeding the output rate, servo control means for performing servo control based upon servo error signals obtained from the RF signals, storage means for storing data supplied by the reproducing means, data processing means for performing pre-set processing on the data read out from the storage means, and control means for controlling playback of the data by the reproducing means and adjusting the servo control means responsive to the quantity of stored data in the storage means exceeding a pre-set value. Thus, if the data quantity stored in the storage means exceeds the quantity of recorded data corresponding to one rotation of the optical disc, readout of the recorded signal from the optical disc is interrupted to effect servo adjustment and track jump of the optical pickup means by servo adjustment means and data playback is re-initiated from the playback stop position at which the readout of the recorded signals has thus been interrupted, so that the servo gain or the servo offset may be adjusted to an optimum state during data reproduction from the optical disc. Stable data playback is enabled even if servo error signals are fluctuated within the optical disc or the servo error signals are changed due to temperature changes in the optical pickup or in the error signal detecting amplifier. Since the time required for initial control of data payback may be shortened as compared to the case in which servo gain control and servo offset control is performed prior to data reproduction, the operation of data reproduction may be initiated more promptly.

On the other hand, the playback data may be continuously outputted by effecting servo gain or offset adjustment after reversion of the optical pickup means to the reproduced track on the optical disc for initiating playback data writing in the storage means.

The playback data may also be continuously outputted by effecting track jump of the optical pickup means after servo gain or servo offset adjustment for starting writing of playback data in the storage means after detection of reversion of the optical pickup means to the playback stop position.

In another aspect, the present invention provides a method for reproducing an optical disc including the steps of deriving data and a servo error signal from RF signals reproduced at a rate exceeding an output rate, storing the reproduced data, controlling data playback by the reproducing means responsive to the stored data quantity exceeding a pre-set value, and adjusting servo control means.

According to the present invention, if the data quantity stored in the storage means exceeds the quantity of recorded data corresponding to one rotation of the optical disc, readout of the recorded signal from the optical disc is discontinued to effect servo adjustment and track jump of the optical pickup means by servo adjustment means, and data playback is re-initiated from the playback stop position at which the readout of the recorded signals has once been interrupted, whereby it becomes possible to effect servo adjustment even during the data playback operation.

On the other hand, the playback data may be continuously outputted by effecting servo gain or offset adjustment after reversion of the optical pickup means to the reproduced track on the optical disc for initiating playback data writing in the storage means, or by effecting track jump of the optical pickup means after servo gain or servo offset adjustment for starting the writing of playback data in the storage means after detection of reversion of the optical pickup means to the playback stop position. Since the servo gain or the servo offset may be adjusted to an optimum state during data reproduction from the optical disc, stable data playback is enabled even if servo error signals are fluctuated within the optical disc or the servo error signals are changed due to temperature changes in the optical pickup or in the error signal detecting amplifier. Since the time required for initial control of data payback may be shortened as compared to the case in which servo gain control and servo offset control is performed prior to data reproduction, the operation of data reproduction may be initiated more promptly.

On the other hand, the playback data may be continuously outputted by effecting servo gain or offset adjustment after reversion of the optical pickup means to the reproduced track on the optical disc for initiating playback data writing in the storage means.

The playback data may also be continuously outputted by effecting track jump of the optical pickup means after servo gain or servo offset adjustment for starting writing of playback data in the storage means after detection of reversion of the optical pickup means to the playback stop position.

DESCRIPTION OF THE PREFERRED EMBODIMENTS

Figure 1:
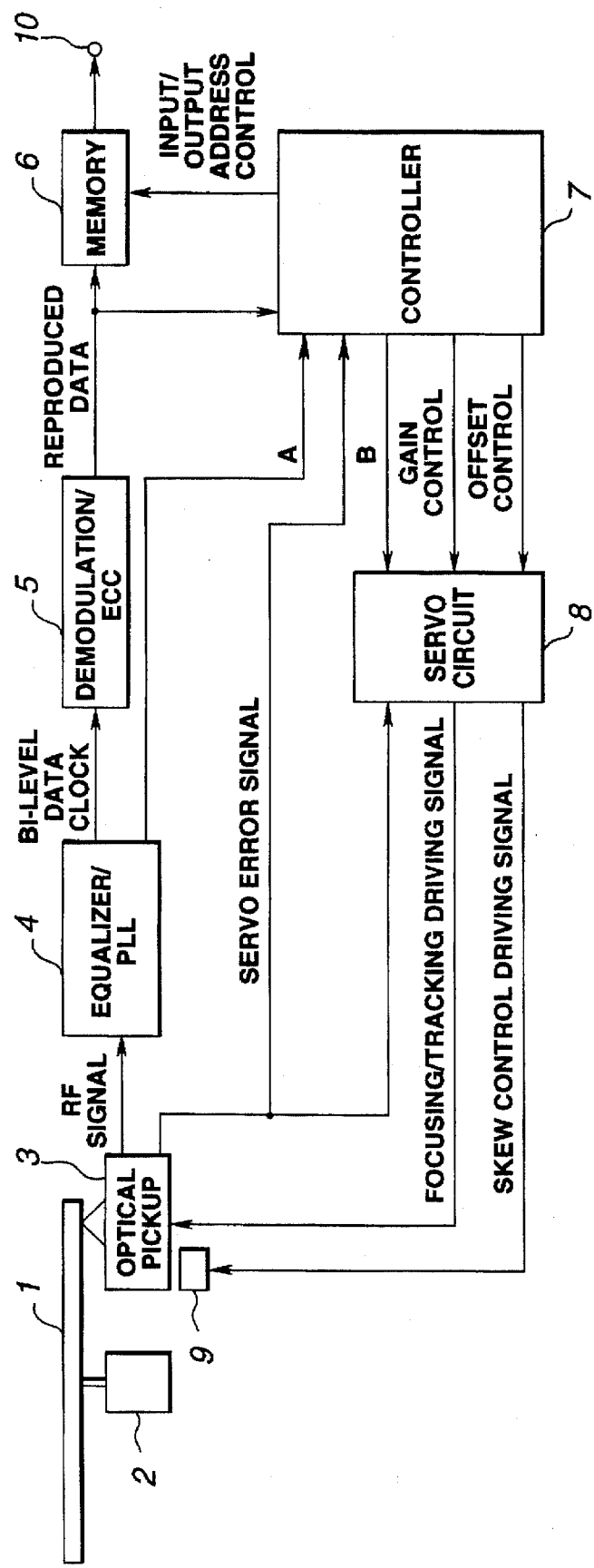
FIG. 1 shows a schematic arrangement of an optical disc reproducing device according to the present invention.

Referring to the drawings, preferred embodiments of the present invention will be explained in detail. FIG. 1 schematically shows as arrangement of an optical disc reproducing device according to the present invention.

The optical disc reproducing device includes a spindle motor 2 for running an optical disc in rotation, and an optical pickup 3 for optically reading out signals from the optical disc 1. The optical disc reproducing device also includes an equalizer/PLL processing circuit 4 for converting the read-out signals into bi-level signals, and a demodulating/ECC processing circuit 5 for demodulating the bi-level signals for generating playback data. The optical disc reproducing device also includes a memory 8 for storing the playback data, and a controller 7 for controlling writing and readout of the playback data in or from the memory 6 using servo error signals from the optical pickup 3, detection signals from the equalizer/PLL processing circuit 4 and playback data from the demodulating/ECC processing circuit 5. The optical disc reproducing device also includes a driving unit 9 for controlling the driving of the spindle motor 2 and the optical pickup 3 using the control signals from the controller 7.

During data reproduction, the optical disc 1 is rotated by the spindle motor 2 at a velocity exceeding the usual data reproducing velocity for condensing and illuminating the laser light radiated from the laser outputting means, such as a laser diode, for receiving the reflected light from the optical disc 1 for reproducing the RF signals.

The disc rotation at the usual data reproducing velocity means such disc rotation in which an output rate of the playback data as found at the time it is outputted by the optical disc reproducing device is equal to the reproducing rate of signals read out by the optical pickup 3.

The RF signals read out from the optical disc 1 are fed to the equalizer/PLL processing circuit 4. When the RF signals are read from the optical disc 1, servo error signals of the focusing error signals and the tracking error signals are also detected and routed to the controller 7 and to a servo circuit 8.

The equalizer/PLL processing circuit 4 reduces distortion in the input RF signals by its equalizing function while converting the analog signals into bi-level signals using clock signals by phase-locked loop (PLL) processing. These bi-level signals are routed along with clock signals to the demodulating/ECC processing circuit 5. From the equalizing/PLL processing circuit 4, a status signal A for judging whether or not the input RF signals are in a satisfactory state is outputted to the controller 7. The status signal A is e.g., a phase deviation quantity indicating signal between clock signals and bi-level signals (jitter) or an error rate detection signal.

The demodulating/ECC processing circuit 5 demodulates the bi-level signals from the equalizer/PLL processing circuit 4 and reproduces data and the subsidiary information such as the frame information or the sector information of the reproduced data. The demodulating/ECC processing circuit 5 also effects error correction using the error correction code ECC. The resulting playback data is supplied along with the subsidiary information to the controller 7.

In the memory 6, playback data from the demodulator/ECC processing circuit 5 are stored. The memory 6 needs to have a storage capacity exceeding the quantity of data stored on the outer most periphery of the optical disc 1. The storage capacity of the memory 6 in the present embodiment is slightly less than twice the data quantity.

The controller 7 controls the address of the memory 6, based upon the frame or sector information, and manages control for sequentially writing playback data from the demodulator/ECC processing circuit 5 in the memory 6. The controller 7 also manages control for sequentially reading out playback data from the memory 6 in accordance with the required data outputting rate. The playback data thus read out are outputted at an output terminal 10 so as to be routed to external equipments as audio or video data.

If the playback data is utilized e.g., as video or audio data, the output rate of the playback data corresponds to the sampling rate as prescribed in audio or video standards.

The controller 7 also outputs a reference disturbance signal B, a servo gain control signal and a servo offset control signal to the servo circuit 8, using the input status signal A and the respective servo error signals, by way of performing servo adjustment operations.

The reference disturbance signal B is a signal supplied for adjusting the servo gain in the focusing servo or adjusting the servo gain in the tracking servo, and is e.g., a signal of a sole frequency having a constant amplitude.

The servo circuit 8 outputs to an actuator in the optical pickup 3 a driving signal for correctly performing focusing servo and tracking servo operations, using the respective servo error signals outputted by the optical pickup 3 and the signal from the controller 7, while outputting a skew controlling driving signal to the driving unit 9 for driving control of the optical pickup 3.

Figure 2:
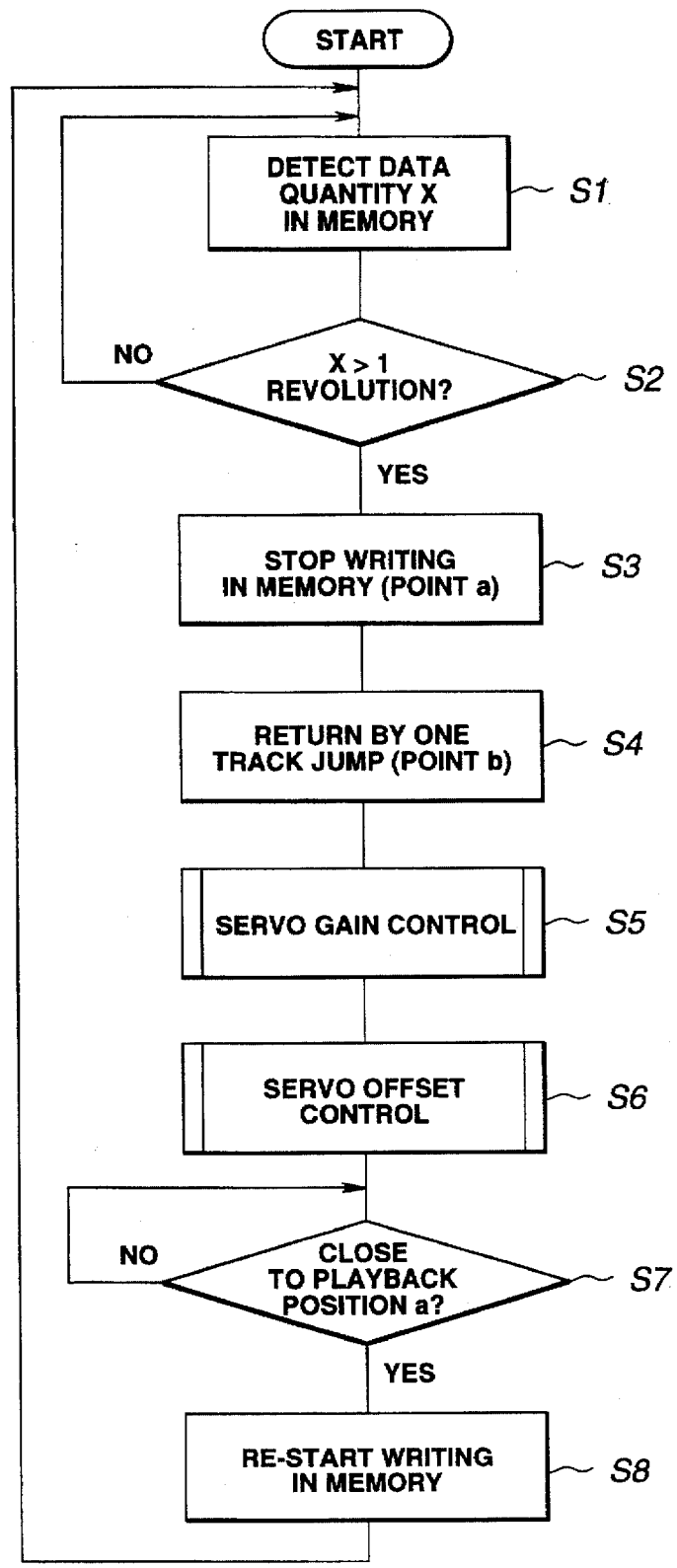
FIG. 2 is a flowchart for showing a first illustrative processing sequence of the optical disc reproducing method according to the present invention.

FIG. 2 shows, in a flowchart, the first illustrative processing sequence in the optical disc reproducing method according to the present invention. Referring to this flowchart, the servo adjustment operation during data reproduction is hereinafter explained.

At step S1, the optical disc 1 is rotated by the spindle motor 2 at a velocity exceeding the usual data reproducing velocity for reading out recorded signals from the optical disc 1. The recording signals thus read out are reproduced by the equalizer/PLL processing circuit 4 and the demodulating/ECC processing circuit 5 so as to be written in the memory 6 under address control from the controller 7. The controller 7 controls data writing/readout in or from the memory 6 for detecting the quantity of data X stored in the memory 8.

At step S2, the controller 7 detects the subsidiary information, such as the frame or sector information, or the period of rotation of the optical disc 1 by the spindle motor 2 for judging whether or not the quantity of data X stored in the memory 6 exceeds the quantity of data outputted during the time of one complete revolution of the optical disc 1. This data quantity is termed herein the data quantity for one disc rotation. If it is found that the data quantity X is not in excess of the data quantity for one disc rotation, the program returns to step S1 for detecting the data quantity X in order to continue the decision by comparing the data quantity X to the data quantity for one disc rotation.

If it is found that the data quantity X exceeds the data quantity for one disc rotation, the program transfers to step S3 to store the position of the above decision as e.g., the playback stop position a. The writing of the playback data in the memory is then discontinued and the optical pickup 3 is caused to jump at step S4 by track jump to a point b one track before the track where the point a exists. Subsequently, the servo control processing or servo offset control processing as later explained is carried out. Specifically, at step S5, the servo gain control mode is set at step S5 for carrying out the servo gain control processing as later explained. If the servo gain control processing is not performed, the program transfers to step S8 for setting the servo offset control mode for carrying out the servo offset control processing.

During the operation of the servo gain control mode of step S5 or the operation of the servo offset control mode of step S8, the playback data continues to be read out from the memory 8.

If the processing time of the servo control mode, for example, is longer than the time of one complete revolution of the optical disc such that the processing cannot be executed to its end, the processing currently executed is discontinued so that, when the servo gain control mode operation is subsequently executed, the processing is re-stated at the point where the previous processing was stopped. The servo offset control mode operation is carried out in the same manner as the servo gain control operation if the processing time is longer than the time of one complete rotation of the optical disc.

During the respective servo control processing operations, the optical disc is kept in rotation. Thus, at step S7, it is judged whether or not the optical disc 3 has been returned to a position close to the point a. If it is found in this manner that the optical pickup 3 has been returned to the point a, the program transfers to step S8 where the data reproducing operation from the optical disc and the playback data writing operation in the memory are re-initiated at the same time as the program reverts to step S1 for detecting the data quantity X in the memory.

Figure 3:
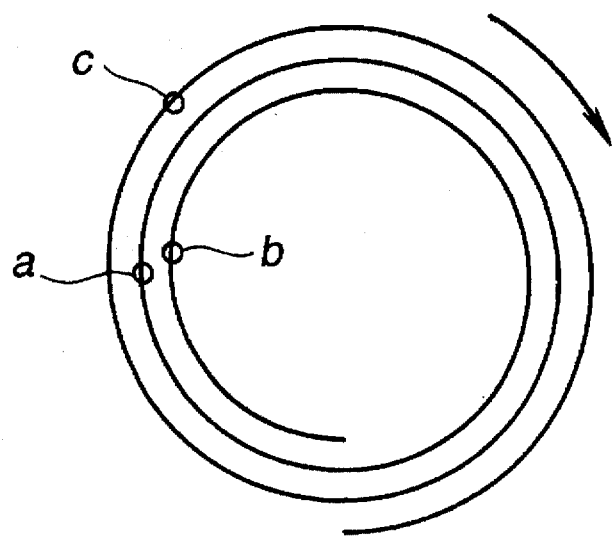
FIG. 3 illustrates the relative track position on the optical disc in each processing operation.
Figure 4:
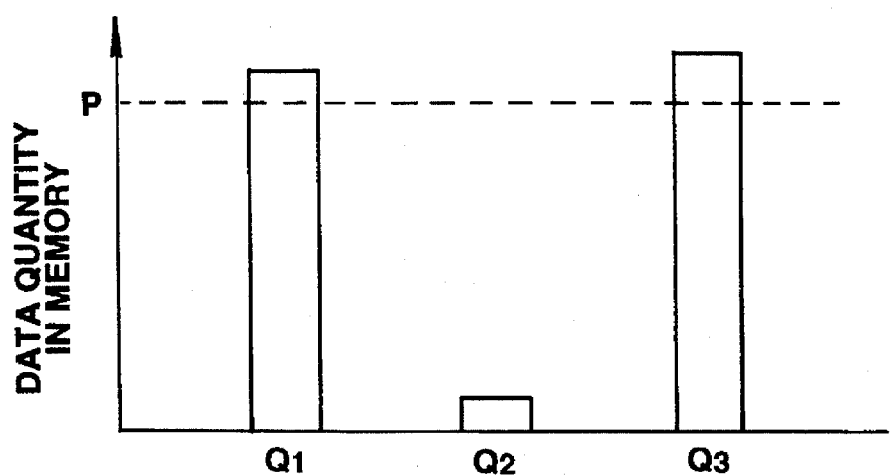
FIG. 4 shows the data quantity in the memory in each processing operation.

Referring to FIG. 3 showing the track positions on the optical disc during the processing operations shown in FIG. 2, and also to FIG. 4 showing the data quantity in the memory at the respective positions, the positions on the optical disc and the data quantity in the memory during the processing operations shown in FIG. 2 are explained in detail.

It is assumed that, in the optical disc reproducing device, data is reproduced from the spirally extending track on the optical disc in a direction indicated by an arrow mark, that is, the optical disc is rotated in a direction opposite to the arrow-mark direction.

If, at step S3 in FIG. 2, the point a at which the data quantity X in the memory has been decided to have exceeded the data quantity for one disc rotation is the point a in FIG. 3, the point b of the directly previously reproduced track, to which the track jump is to be carried out at step S4 after this decision, is also indicated as the point b in FIG. 3. The data quantity in the memory at this time is indicated at Q1 in FIG. 4, in which P denotes the data quantity for one optical disc rotation. Thus the data quantity Q1 in the memory exceeds the data quantity P corresponding to one disc rotation.

Subsequently, during the time the optical disc is rotated from the point b to the point a, the data writing in the memory is discontinued in order to perform the servo gain control processing operation at step S5 and the servo offset control processing operation at step S6 in FIG. 2.

Since the data readout from the memory is continued during the servo gain control operation and the servo offset control operation, the data in the memory is decreased in a quantity corresponding to the read-out quantity, as indicated at Q2 in FIG. 4, when the servo gain control operation and the servo offset control operation have been terminated and the optical pickup has again been returned to the point a.

Subsequently, if it is detected that the data in the memory has been stored in a quantity exceeding the data quantity for one disc rotation, as indicated at Q3 in FIG. 4, this point C is deemed to be the point a at step S3 in FIG. 2 in order to carry out the operations at steps S3 to S8. It is noted that the operations at steps S5 and S6 need not be carried out at each track jump. For example, the operations at step S5 and S6 may be carried out each time the optical pickup is moved a pro-set distance in the radial direction or at a pro-set time interval. The operation at step S6 may be carried out when the status signal A is found on comparison to be smaller than a pro-set value.

The processing operation during the servo gain control operation and that during the servo offset control operation will be explained by referring to the flowcharts of FIGS. 5 and 6.

Figure 5:
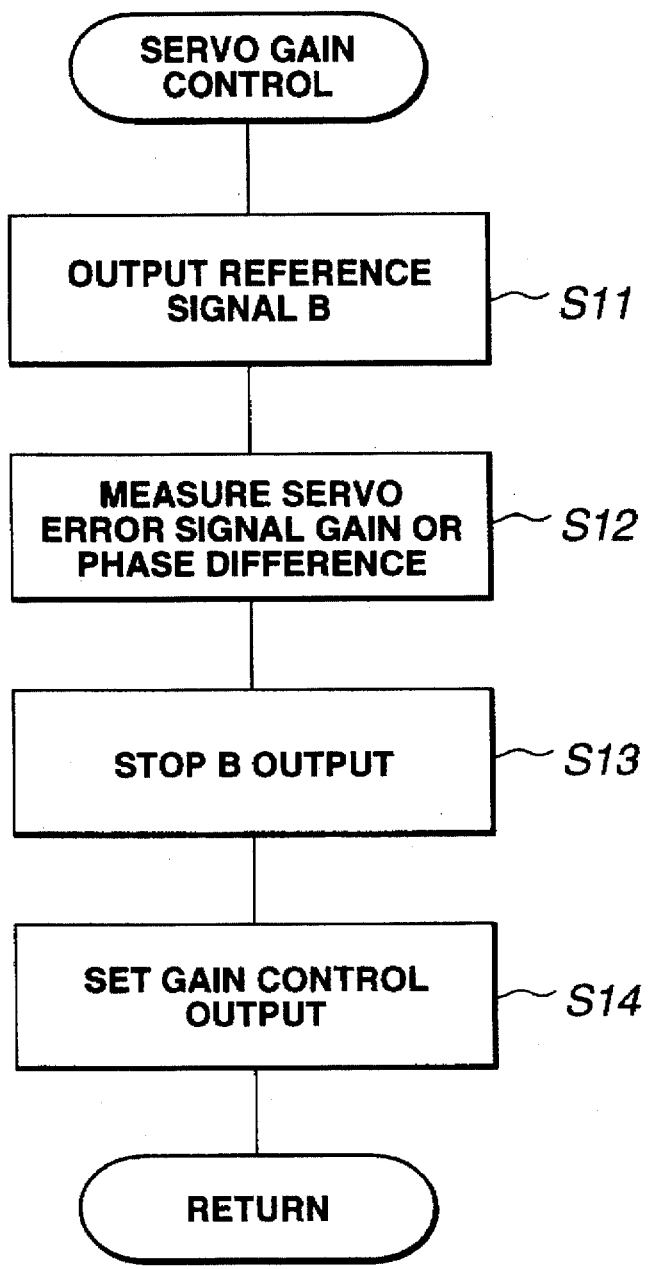
FIG. 5 is a flowchart showing the servo gain control processing sequence.

When the servo gain control mode is initiated, the reference disturbance signal B is supplied at step S11 of FIG. 5 from the controller 7 to the servo circuit 8. The reference disturbance signal B is a signal set to a certain frequency and a certain amplitude. Within the servo circuit 8, the reference disturbance signal B is applied to the focusing servo and tracking servo driving signals to affect the servo error signals. At step S12, the controller 7 reads out changes in the servo error signals detected by the optical pickup 3 for measuring the gain difference or the phase difference caused by the servo error signal and the reference disturbance signal B. The measured values of the gain difference or the phase difference are then compared to pre-set values for judging whether or not the difference values are within an optimum range.

Subsequently, at step S13, the outputting of the reference disturbance signal B is terminated. Then, at step S14, an output for the servo gain control is set. Specifically, if the servo gain is found at step S12 to be larger than the optimum value, the servo gain is decreased by one step. Conversely, if the servo gain is found to be smaller than the optimum value, the servo gain is increased by one step. As for the phase difference, if the phase difference is found at step S12 not to be within an optimum range, the phase difference is adjusted at step S13 so as to be within the optimum range, with the reference disturbance signal B not then being issued.

If there is time allowance for repeating the servo gain control operation, the servo gain control operation may be carried out repeatedly.

Figure 6:
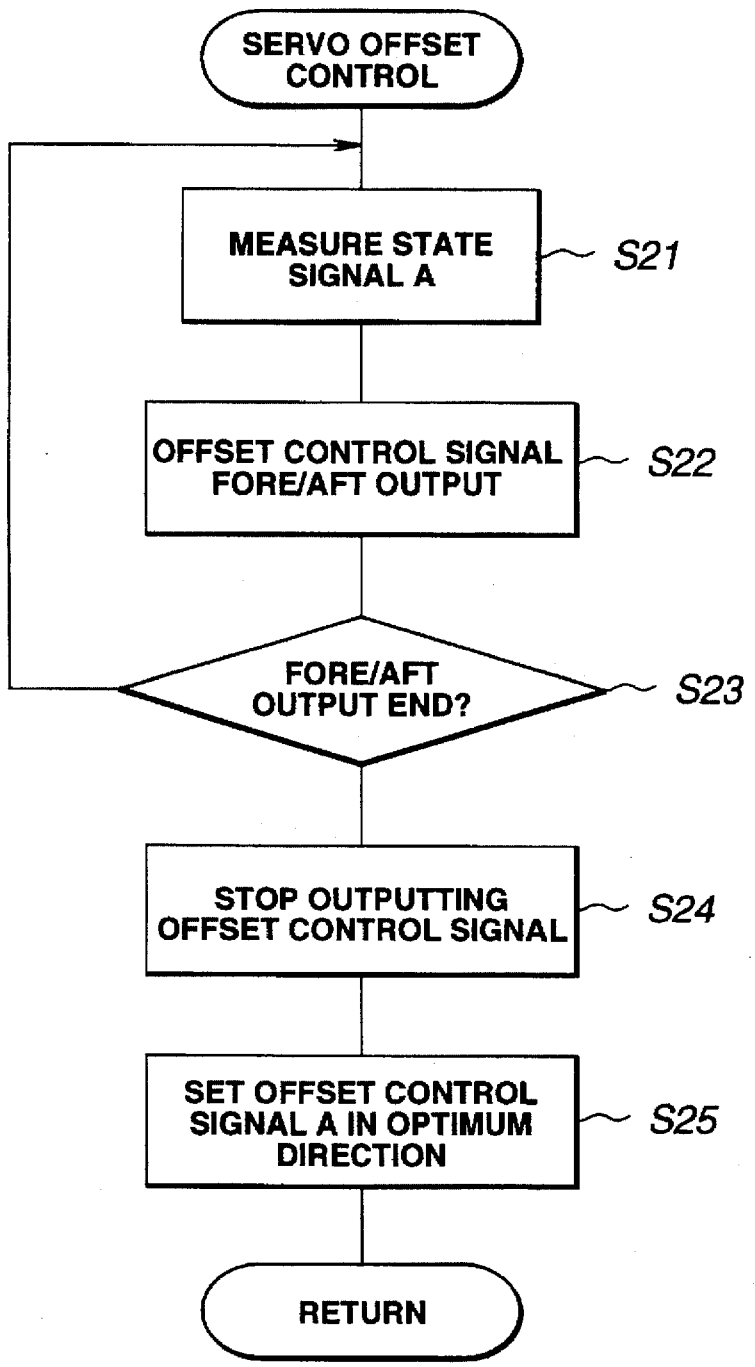
FIG. 6 is a flowchart showing the servo offset control processing sequence.

For the servo offset control mode, the status signal A outputted from the equalizer/PLL processing circuit 4 is read out at step S21 in FIG. 6.

The status signal A is a signal for deciding whether or not the RF signals outputted from the optical pickup 3 is in an optimum state with a low error rate. Specifically, the status signal may be a signal indicating the maximum amplitude of the RF signal or the phase deviation signal between the bi-level data and the clocks during the PLL signal processing of the signal indicating the maximum amplitude of the RF signals or the signal by equalizer/PLL processing circuit 4. The amplitude of the RF signal assumes a maximum value in the optimum state, while the phase deviation signal assumes a minimum value in the optimum state.

For example, if the offset setting is in the optimum state, the status signal A becomes worse by changing the offset in the positive or negative direction. On the other hand, if the offset as set is deviated from the optimum state, the offset may be changed in the positive or negative direction for judging the shifting direction in which the status signal A approaches the optimum value. Thus it suffices to shift the offset setting value in the thus found shifting direction of approaching the optimum value.

Thus, at step S22, the offset control signal is supplied from the controller 7 to the servo circuit 8 which will cause the offset setting value to be changed to a positive value. It is then found at step S23 that the offset control signal is not applied which will cause the offset setting value to be changed in the negative direction. Thus the program returns to step S21 where the controller 7 reads out and measures the status signal A outputted from the equalizer/PLL processing circuit 4. After the offset control signal is supplied to the servo circuit 8 at step S22 which will cause the offset setting value to be changed to a negative value, it is decided at step S23 that an offset control signal is outputted to the servo circuit 8 for changing the offset setting value to the positive and negative directions. The program then transfers to step S24.

At step S24, outputting of the offset control signal to the servo circuit 8 is terminated. At step S25, the controller 7 outputs an offset control signal to the servo circuit 8 in direction in which the status signal A will be in an optimum state.

If there is time allowance for repeating the servo gain control operation, the servo offset control operation may be carried out repeatedly as in the case of the servo gain control operation.

Figure 7:
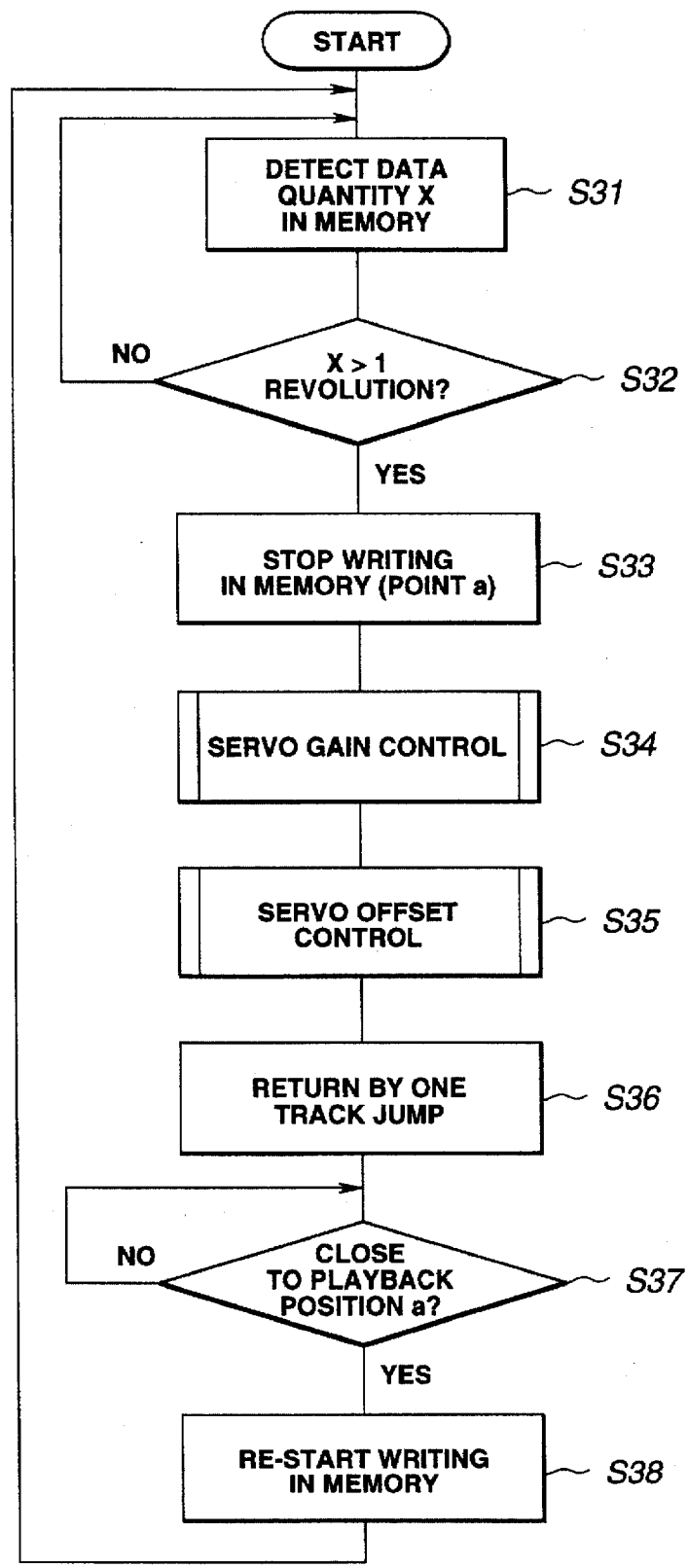
FIG. 7 is a flowchart for showing a second illustrative processing sequence of the optical disc reproducing method according to the present invention.

Referring to FIG. 7 showing the second illustrative processing sequence by the optical disc reproducing method according to the present invention, the servo adjustment during servo reproduction is hereinafter explained.

As in the above-described first illustrative processing sequence, the optical disc 1 is rotated by the spindle motor at step S31 at a velocity exceeding the usual data reproducing velocity for reading out pre-recorded signals from the optical disc 1. The recording signals thus read out are reproduced by the equalizer/PLL processing circuit 4 and the demodulating/ECC processing circuit 5 so as to be written in the memory 8 under address control from the controller 7. The controller 7 controls data writing/readout in or from the memory 8 for detecting the quantity of data X stored in the memory 8.

At step S32, the controller 7 detects the subsidiary information, such as the frame or sector information, or the period of rotation of the optical disc 1 by the spindle motor for judging whether or not the quantity of data X stored in the memory 8 exceeds the data quantity for one disc rotation. If it is found that the data quantity X is not in excess of the data quantity for one disc rotation, the program returns to step for detecting the data quantity X in order to continue the decision by comparing the data quantity X to the data quantity for one disc rotation.

If it is found that the data quantity X exceeds the data quantity for one disc rotation, the program transfers to step to store the position of the above decision as e.g., the playback stop position a. The writing of the playback data in the memory is then discontinued. The above-described servo gain control processing or servo offset control processing is then carried out.

Specifically, the servo gain control mode is set at step S34 in order to carry out the servo gain control operation as later explained. During the operation of the servo gain control mode of step S34 or the operation of the servo offset control mode of step S35, the playback data continues to be read out from the memory 8.

After termination of the servo gain control mode or the servo offset control mode, the optical pickup 3 is caused to jump at step S38 to a track directly previous to the current track position on the optical disc for reversion to the starting track position. It is noted that the processing time is set so that the servo gain control mode or the servo offset control mode will be terminated within a time interval shorter than the time of one complete rotation of the optical disc.

It is then judged at step S37 whether or not the optical pickup 3 has been restored to a position close to he point a. If the optical disc has been found to have returned to the point a, data reproduction from the optical disc and writing of the playback data in the memory are re-started, at the same time as the program reverts to step S31 for detecting the data quantity X in the memory 8.

In this manner, the servo control processing operation may be carried out during the data reproducing operation.

In the first and second illustrative processing sequences, it suffices if the servo gain control processing and the servo offset processing are carried out alternately.

In the first and second illustrative processing sequences, it is decided whether or not the data quantity stored in the memory corresponds to the data quantity for one disc rotation as a reference data quantity. This reference data quantity is not limited to the data quantity for one disc rotation but may be that for two disc rotations. It then becomes necessary to change the number of tracks of track jump to two or more tracks in association with the reference data quantity.

What is claimed is:

1. Apparatus for reproducing data stored on an optical disk, comprising:

an optical pickup device for picking up data stored on the optical disk to produce an RF signal, said optical pickup device being responsive to a servo control signal and supplying a servo error signal representing an amount of servo error as an output;

means for generating from said RF signal a data signal at a data input rate greater than a data output rate;

storage means for storing the data signal as stored data at the data input rate, and for outputting the stored data as a reproduced data output signal at said data output rate;

control means for inhibiting the storage of the data signal in the storage means when an amount of stored data exceeds a predetermined amount, and for controlling the optical pickup device to pick up data on the optical disk previously reproduced when the storage means is inhibited from storing the data signal, said control means including means for supplying, when the storage means is inhibited from storing the data signal, a reference disturbance signal representing an introduced servo gain error; and servo control means for controlling a servo of the optical pickup device in accordance with data reproduced when the storage means is inhibited from storing the data signal, said servo control means including means for generating said servo control signal in accordance with an expected predetermined servo error and the amount of actual servo error as indicated by said servo error signal supplied from the optical pickup device, and said servo control means being operable to modify said servo control signal using the supplied reference disturbance signal.

2. The apparatus of claim 1, wherein said servo control means operates during an inhibit time when the storage means is inhibited from storing the data signal.

3. The apparatus of claim 1, wherein said control means controls the storage means to recommence the storage of the data signal when the amount of stored data is less than a second predetermined amount.

4. The apparatus of claim 3, wherein said control means includes identification means for identifying a location on the disk from which data is reproduced when storage of the reproduced data is inhibited; and said control means controls the storage means to recommence the storage of the data signal when the optical pickup device picks up data from the identified location on the optical disk.

5. The apparatus of claim 1, wherein said control means controls said storage means to continuously output the stored data at said data output rate during both a time when the storage means stores the data signal and a time when the storage means is inhibited from storing the data signal.

6. The apparatus of claim 1, wherein said optical disk includes a plurality of concentric tracks having data stored therein; the optical pickup device picks up data stored in successive tracks; and said control means controls the optical pickup device to pick up data from a predetermined number of previously reproduced tracks when the storage means is inhibited from storing the data signal.

7. The apparatus of claim 6, wherein said control means is operable to control the optical pickup device to pick up data from the one track previously reproduced when the storage means is inhibited from storing the data signal.

8. The apparatus of claim 1, wherein said optical disk includes a plurality of concentric tracks having data stored therein; and said control means inhibits the storage of the data signal in the storage means when an amount of data stored in the storage means exceeds an amount of data stored in a predetermined number of tracks of the optical disk.

9. The apparatus of claim 8, wherein said predetermined number of tracks is one.

10. Apparatus for reproducing data stored on an optical disk, comprising:

an optical pickup device for picking up data stored on the optical disk to produce an RF signal, said optical pickup device being responsive to a servo control signal and supplying a servo error signal representing an amount of servo error as an output, said servo control signal including a servo offset signal;

means for generating from said RF signal a data signal at a data input rate greater than a data output rate;

storage means for storing the data signal as stored data at the data input rate, and for outputting the stored data as a reproduced data output signal at said data output rate;

control means for inhibiting the storage of the data signal in the storage means when an amount of stored data exceeds a predetermined amount, and for controlling the optical pickup device to pick up data on the optical disk previously reproduced when the storage means is inhibited from storing the data signal, said control means including means for supplying, when the storage means is inhibited from storing the data signal, an offset control signal initially representing a positive change to said servo offset signal and then representing a negative change to said servo offset signal; and servo control means for controlling a servo of the optical pickup device in accordance with data reproduced when the storage means is inhibited from storing the data signal, said servo control means including means for generating said servo control signal from said servo error signal, said means for generating said servo control signal being operable to generate said servo offset signal in accordance with the servo error signal responsive to the positive change to the servo offset signal and the servo error signal responsive to the negative change to the servo offset signal.

11. Method of reproducing data stored on an optical disk, comprising the steps of:

generating a servo control signal for controlling the optical pickup of data from the optical disk;

optically picking up data stored on the optical disk to produce an RF reproduction signal;

supplying a servo error signal representing an amount of servo error when data is optically picked up, said step of generating said servo control signal being carried out by generating said servo control signal in accordance with an expected predetermined servo error and the amount of actual servo error as indicated by said servo error signal;

generating from said RF reproduction signal a data signal at a data input rate greater than a data output rate;

storing the data signal in a memory as stored data at the data input rate;

outputting the stored data from the memory at said data output rate;

inhibiting the storage of the data signal in the memory when an amount of stored data exceeds a predetermined amount;

supplying, when the memory is inhibited from storing the data signal, a reference disturbance signal representing an introduced servo gain error;

modifying said servo control signal using the supplied reference disturbance signal;

optically picking up data stored on the optical disk previously reproduced when the memory is inhibited from storing the data signal; and establishing servo control of the optical pickup of data stored on the optical disk in accordance with data reproduced when the memory is inhibited from storing the data signal.

12. The method of claim 11, wherein servo control is established during an inhibit time when the memory is inhibited from storing the data signal.

13. The method of claim 11, further comprising the step of controlling the memory to recommence the storage of the data signal when the amount of stored data is less than a second predetermined amount.

14. The method of claim 13, further comprising the step of identifying a location on the disk from which data is reproduced when storage of the reproduced data is inhibited; and the step of controlling the memory to recommence the storage of the data signal is carried out when data from the identified location on the optical disk is optically picked up.

15. The method of claim 11, wherein the step of outputting the stored data from the memory at said data output rate is continuously carried out during both a time when the memory stores the data signal and a time when the memory is inhibited from storing the data signal.

16. The method of claim 11, wherein said optical disk includes a plurality of concentric tracks having data stored therein; the first step of optically picking up data is carried out by picking up data stored in successive tracks; and the second step of optically picking up data is carried out by picking up data from a predetermined number of previously reproduced tracks when the memory is inhibited from storing the data signal.

17. The method of claim 16, wherein the second step of optically picking up data is carried out by picking up data from the one track previously reproduced when the memory is inhibited from storing the data signal.

18. The method of claim 11, wherein said optical disk includes a plurality of concentric tracks having data stored therein; and the step of inhibiting is carried out when an amount of data stored in the memory exceeds an amount of data stored in a predetermined number of tracks of the optical disk.

19. The method of claim 18, wherein said predetermined number of tracks is one.

20. Method of reproducing data stored on an optical disk, comprising the steps of:

generating a servo control signal for controlling the optical pickup of data from the optical disk, said servo control signal including a servo offset signal;

optically picking up data stored on the optical disk to produce an RF reproduction signal;

supplying a servo error signal representing an amount of servo error when data is optically picked up;

generating from said RF reproduction signal a data signal at a data input rate greater than a data output rate;

storing the data signal in a memory as stored data at the data input rate;

outputting the stored data from the memory at said data output rate;

inhibiting the storage of the data signal in the memory when an amount of stored data exceeds a predetermined amount;

supplying, when the memory is inhibited from storing the data signal, an offset control signal initially representing a positive change to said servo offset signal and then representing a negative change to said servo offset signal, said step of generating said servo control signal being carried out by generating said servo offset signal in accordance with the servo error signal responsive to the positive change to the servo offset signal and the servo error signal responsive to the negative change to the servo offset signal;

optically picking up data stored on the optical disk previously reproduced when the memory is inhibited from storing the data signal; and establishing servo control of the optical pickup of data stored on the optical disk in accordance with data reproduced when the memory is inhibited from storing the data signal.

* * * * *